(12) United States Patent
Kihm

(10) Patent No.: US 8,393,086 B1
(45) Date of Patent: Mar. 12, 2013

(54) APPARATUS FOR MEASURING TREND AND PLUNGE

(75) Inventor: You-Hong Kihm, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 13/480,771

(22) Filed: May 25, 2012

(30) Foreign Application Priority Data

Mar. 15, 2012 (KR) .................. 10-2012-0026506

(51) Int. Cl.
*G01B 5/24* (2006.01)
(52) U.S. Cl. ................... 33/341; 33/355 R; 33/471
(58) Field of Classification Search .................. 33/1 N, 33/316, 319, 320, 340, 341, 355 R, 424, 465, 33/471, 1 H, 521
See application file for complete search history.

(56) References Cited

U.S. PATENT DOCUMENTS

| | | | | |
|---|---|---|---|---|
| 3,690,009 A | * | 9/1972 | Henley, III | 33/457 |
| 4,394,799 A | | 7/1983 | Moree et al. | |
| 4,879,812 A | * | 11/1989 | Rabb | 33/1 MP |
| 6,134,796 A | * | 10/2000 | Johnson | 33/457 |
| 6,516,526 B1 | | 2/2003 | Iden | |
| 6,647,633 B2 | * | 11/2003 | Iden | 33/352 |
| 2008/0034599 A1 | * | 2/2008 | Hamilton | 33/471 |
| 2008/0307661 A1 | * | 12/2008 | Hembree | 33/427 |

FOREIGN PATENT DOCUMENTS

| KR | 200130506 Y1 | 3/1999 |
|---|---|---|
| KR | 200205063 Y1 | 1/2001 |

* cited by examiner

*Primary Examiner* — G. Bradley Bennett
(74) *Attorney, Agent, or Firm* — Kile Park Goekjian Reed & McManus PLLC

(57) ABSTRACT

An apparatus for measuring trend and plunge of a geologic line feature and an auxiliary apparatus for measuring trend and plunge. The apparatus for measuring trend and plunge includes a rod operable to be disposed parallel to a lineation, a rotation block connected to an end of the rod and being operable to rotate around a central axis of the rod, the rotation block includes a hinge shaft extending in a direction perpendicular to the central axis of the rod, a plate coupled to the hinge shaft of the rotation block so that the plate is rotatable around the hinge shaft, a protractor disposed on the hinge shaft, and a measuring unit disposed on the plate, the measuring unit includes a compass configured to confirm a direction of the rod, thereby measuring the trend when the plate is horizontally disposed.

6 Claims, 4 Drawing Sheets

APPARATUS FOR MEASURING TREND AND PLUNGE

CROSS-REFERENCE TO RELATED APPLICATION

This application claims priority to Korean Patent Application No. 10-2012-0026506 filed on Mar. 15, 2012 and all the benefits accruing therefrom under 35 U.S.C. §119, the contents of which are incorporated by reference in their entirety.

BACKGROUND

The present disclosure relates to geology formation analysis. More specifically the present disclosure relates to an apparatus for measuring trend and plunge of a lineation observed on geologic foliation or bedding.

Structural geology includes the observation and measurement of rock plane and lines and uses measurements of present day rock geometries to determine the history of deformation in various geologic strata.

For a plane a direction of an intersection defined by a bedding plane and a horizontal plane is referred to as strike and an angle between the bedding plane and the horizontal plane is referred to as dip.

In field work, strike is typically measured by supporting a side surface of a Brunton compass on a bedding plane and leveling the compass to read a magnetic North direction of the compass relative to the bedding plane. Dip is measured by locating an inclinometer in a direction perpendicular to the horizontal plane to read an angle of dip. Strike is scalar and dip is a vector.

Linear structural features within rock formations are known in structural geology as lineation. Lineation is measured in terms of trend and plunge. Trend is the bearing of a line from magnetic North of a linear geologic feature measured in a direction in which the line is inclined downward. Plunge is the degree of inclination of the linear feature. Together trend and plunge define a line vector of a geologic line in a formation. If the lineation has a very small size it is difficult to accurately measure trend and plunge.

SUMMARY

The present disclosure provides an apparatus for measuring trend and plunge.

In accordance with an exemplary embodiment, an apparatus for measuring a trend and plunge includes: a rod disposed parallel to a lineation; a rotation block connected to an end of the rod and rotated around a central axis of the rod, the rotation block including a hinge shaft extending in a direction perpendicular to the central axis; a plate coupled to the hinge shaft of the rotation block so that the plate is rotatable around the hinge shaft; a protractor disposed on the hinge shaft, the protractor being configured to confirm an angle between the rotation block and the plate, thereby measuring the trend when the plate is horizontally disposed; and a measuring unit disposed on the plate, the measuring unit including a compass configured to confirm a direction of the rod, thereby measuring the trend when the plate is horizontally disposed.

The measuring unit may further include a level gauge configured to confirm horizontality of the plate.

The protractor may be fixed to the plate and rotated together with the plate, and the rotation block may further include a needle protruding toward the plate and parallel to the rotation block to precisely confirm the trend.

In accordance with another exemplary embodiment, an auxiliary apparatus for measuring trend and plunge includes: a rod disposed parallel to a lineation; a rotation block connected to an end of the rod and rotated around a central axis of the rod, the rotation block including a hinge shaft extending in a direction perpendicular to the central axis; a plate coupled to the hinge shaft of the rotation block so that the plate is rotatable around the hinge shaft, the plate being configured to support a measuring unit for measuring the trend; and a protractor disposed on the hinge shaft, the protractor including a protractor configured to measure the trend.

The protractor may be fixed to the plate and rotated together with the plate, and the rotation block may further include a needle protruding toward the plate and parallel to the rotation block to precisely confirm the trend.

The plate may further include a fixing member configured to fix the measuring unit.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Context of the Invention

Geological features of bed planes, fold axes, faults and other geologic structures can be described using measurements of strike and dip. For linear fabric such as hingeline, axis or lineation trend and plunge represent bearing and inclination.

Figure 1:
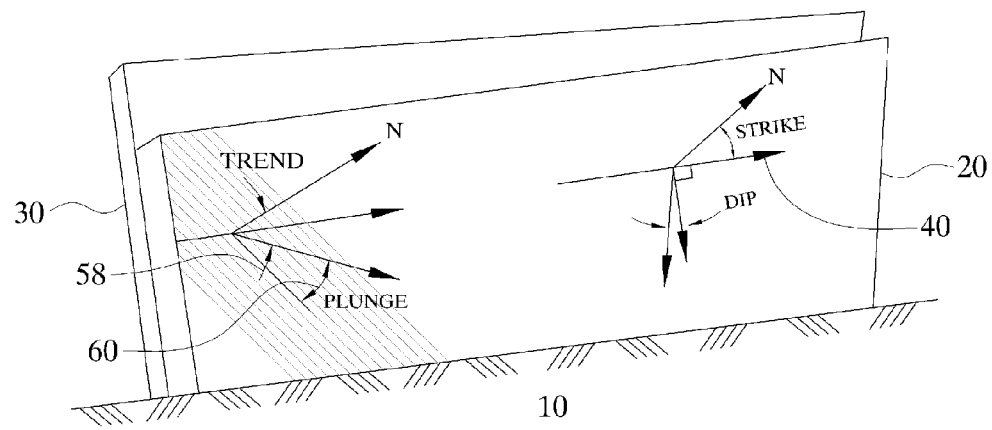
FIG. 1 is a schematic representation of a geologic formation with planar measurements of strike and dip and linear angular measurements of trend and plunge.

In FIG. 1 a generally horizontal ground earth surface 10 has an outcropping of rock strata or beds 20 and 30. Strike is a measure of an angle created between a strike line 40 on the rock strata 20 drawn parallel to a horizontal ground surface and magnetic North as determined by a compass.

The dip angle is an angle in a vertical plane extending from the horizontal plane down to the line of intersection of the vertical plane with the geologic strata bedding 20. Dip is perpendicular to strike and has both a compass direction and an angle.

With respect to lineation in a formation trend 50 is the bearing of a linear feature measured in the direction to which the line is inclined down. Plunge 60 it the amount of the inclination of the linear feature. Trend and plunge are scalars and together they define the vector line. The trend of any line on a vertical plane is the same as the strike of that plane.

Trend and Plunge Measurement Apparatus

An apparatus for measuring trend and plunge and an auxiliary apparatus for measuring trend and plunge in accordance with an exemplary embodiment will be described in detail with reference to the accompanying drawings. Since the present disclosure may have diverse modified embodiments, preferred embodiments are illustrated in the drawings and are described in the detailed description of the invention. However, this does not limit the present disclosure within specific embodiments and it should be understood that the present disclosure covers all the modifications, equivalents, and replacements within the idea and technical scope of the present disclosure. In description of the drawings, like reference numerals in the drawings denote like elements. In the drawings, dimensions of structures are enlarged or exaggerated for clarity.

It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment.

In the following description, the technical terms are used only for explaining a specific exemplary embodiment while not limiting the present disclosure. The terms of a singular form may include plural forms unless referred to the contrary. The meaning of 'include' or 'comprise' specifies a property, a numeral, a step, an operation, an element or a combination thereof, but does not exclude other properties, numerals, steps, operations, elements or combinations thereof.

Unless terms used in the present invention are defined differently, the terms may be construed as the meaning known to those skilled in the art. Terms that are generally used and have been in dictionaries should be construed as having meanings matched with contextual meanings in the art. In this description, unless defined clearly, terms should not be excessively construed as being limited to formal meanings.

Figure 2:
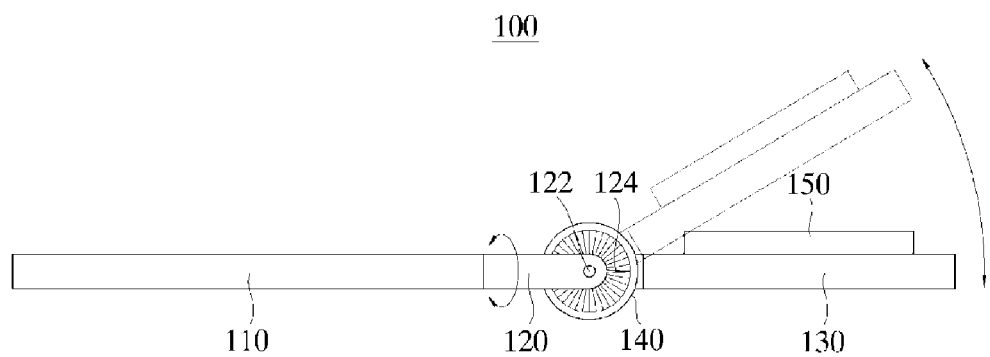
FIG. 2 is a side view of an apparatus for measuring trend and plunge in accordance with an exemplary embodiment.
Figure 3:
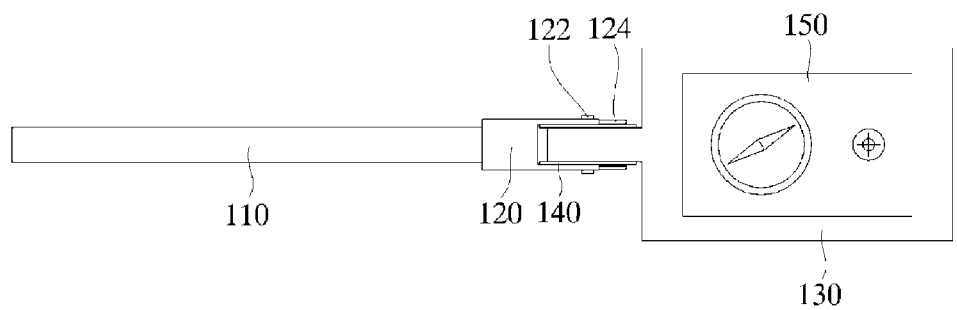
FIG. 3 is a plan view of the apparatus for measuring trend and plunge of FIG. 2.
Figure 4:
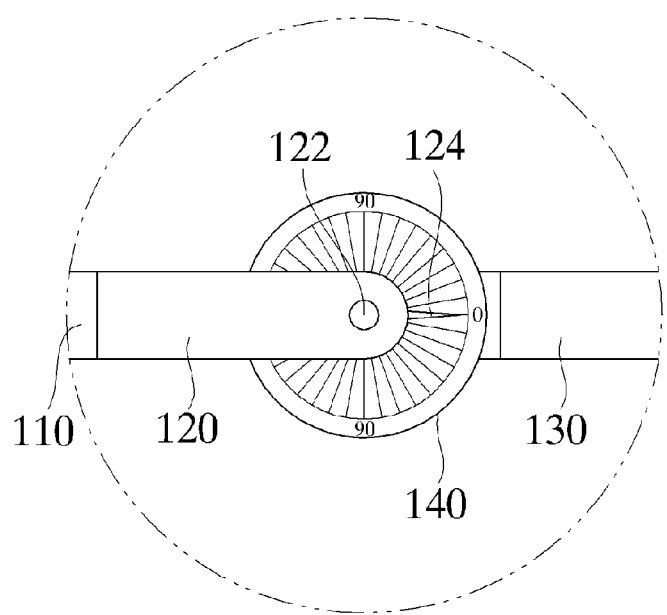
FIGS. 4 and 5 are enlarged views of a rotation block illustrated in FIGS. 2 and 3.
Figure 5:
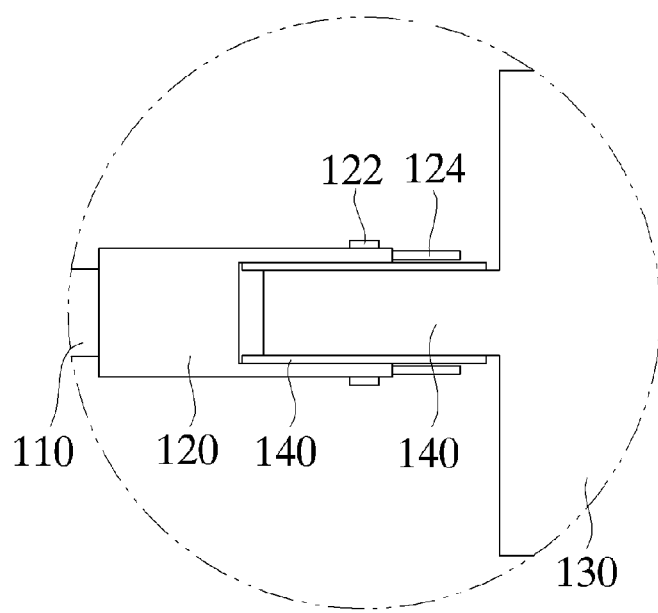

FIG. 2 is a side view of an apparatus for measuring trend and plunge in accordance with an exemplary embodiment. FIG. 3 is a plan view of the apparatus for measuring trend and plunge of FIG. 2. FIGS. 4 and 5 are enlarged views of a rotation block illustrated in FIGS. 2 and 3.

Referring to FIGS. 2 to 5, an apparatus 100 for measuring trend and plunge includes a rod 110, a rotation block 120, a plate 130, a protractor 140, and a measuring unit 150.

The rod 110 has a predetermined length and is designed to be operably disposed parallel to a lineation feature to be measured. The rod 110 may have various shapes such as a polygonal shape or a circular shape in section. Since the rod 110 has the predetermined length, even though the lineation has a short length, the rod 110 may be facilely disposed parallel to the lineation.

The rotation block 120 is connected to an end of the rod 110. The rotation block 120 has a receiving groove (not shown) in one side surface thereof. An end of the rod 110 may be inserted into the receiving groove of the rotation block 120. The rotation block 120 is not be fixed to the rod 110, but is rotatable with respect to a central axis of the rod 110.

The rotation block 120 includes a hinge shaft 122 on the other side surface opposite to the one side surface. The hinge shaft 122 extends in a direction perpendicular to that of the central axis of the rod 110.

The rotation block 120 includes a needle 124 (note FIG. 4) on the other side surface thereof. The needle 124 protrudes from the other side surface in a direction parallel to the rotation block 120. The needle 124 is used for precisely confirming an angle of the protractor 140.

The plate 130 is coupled to a hinge shaft 122 of the rotation block 120. The plate 130 includes a protrusion 132 on one side surface thereof. The protrusion 132 is coupled to the hinge shaft 122. Thus, the plate 130 and the rotation block 120 are hinge-coupled to each other, and the plate 130 is rotatable about the hinge shaft 122.

When the plate 130 and the rotation block 120 have a geologic measured angle there between as the plate 130 is rotated, the rotated state of the plate 130 may be maintained to easily measure the angle between the plate 130 and the rotation block 120. For example, the plate 130 and the rotation block 120 may be firmly coupled to each other to maintain the rotated state of the plate 130. Alternatively, a screw passing through the hinge shaft 122 and coupled to the hinge shaft 122 may be provided to maintain the rotated state of the plate 130 by tightening the screw.

In a state where the rod 110 is disposed parallel to a lineation, rotation of each of the rotation block 120 and the plate 130 may be adjusted to horizontally dispose the plate 130. When the plate 130 is horizontally disposed, the plate 130 is parallel to a horizontal plane. The horizontal plane may be a virtual sea level, i.e., a virtual plane perpendicular to the direction of gravity. Thus, when the plate 130 is horizontally disposed, an angle between the rod 110 and the rotation 120 and the plate 130 is equal to that between the lineation and the horizontal plane. That is, an angle between the rotation block 120 and the plate 130 is the trend of the lineation.

The protractor 140 is disposed on the hinge shaft 122 and perpendicular to the hinge shaft 122. For example, the protractor 140 may be fixed to the plate 130 and rotated together with the plate 130 around the hinge shaft 122.

When the plate 130 is horizontally disposed, the protractor 140 is used for reading an angle between the rotation block 120 and the plate 130. Here, when the needle 124 of the rotation block 120 is used, the angle between the rotation block 120 and the plate 130 may be read to measure trend.

The protractor 140 is fixed to the rotation block and the plate 130, and the needle 124 is disposed on the rotation block 120.

The measuring unit 150 may include a compass 152. The compass 152 is disposed on the plate 130. When the plate 130 is horizontally disposed, the compass 152 measures a direction of the rod 110 with respect to magnetic North. Since the rod 110 is disposed parallel to the lineation, and the horizontal plane is parallel to the plate 130, the rod 110 has the same direction as that of the trend. Thus, the direction of the rod 110 may be measured using the compass 152 on the basis of a magnetic North to measure the trend.

Also, the measuring unit 150 may further include an X-Y axis level gauge 154.

The level gauge 154 is disposed on the plate 130. Thus, a horizontal posture of the plate 130 may be precisely confirmed using the level gauge 154. A bubble level gauge or a water-level gauge may be used as the level gauge 154.

The compass 152 and the level gauge 154 may be integrated with each other. Alternatively, the compass 152 and the level gauge 154 may be separately provided.

The measuring unit 150 may be fixed on the second rotation plate 130. Alternatively, the measuring unit 150 may be detachably disposed on the second rotation plate 130.

In the apparatus 100 for measuring trend and plunge, since the rod 110 may be disposed parallel to the lineation, the trend and plunge may be precisely and reproducibly measured. Also, in the apparatus 100 for measuring the trend and plunge, even though the lineation has a short length, the trend and plunge may be easily measured using the rod 110.

Method for Measuring Trend and Plunge

In a process for measuring linear trend and plunge the apparatus 100 is seated on the bedding plane so that the rod 110 is disposed parallel to the lineation. The rotation block 120 and the plate 130 are rotated to dispose the plate 130 in a horizontal state. Whether the plate 130 is horizontal is confirmed using the level gauge 154.

In the state where the plate 130 is maintained in the horizontal state, the direction of the rod 110 is measured using the compass 152 on the basis of the magnetic North to measure the trend. Also, in the state where the plate 130 is maintained in the horizontal state, an angle between the rotation block 120 and the plate 130 may be measured using the protractor 140 to measure plunge.

Figure 6:
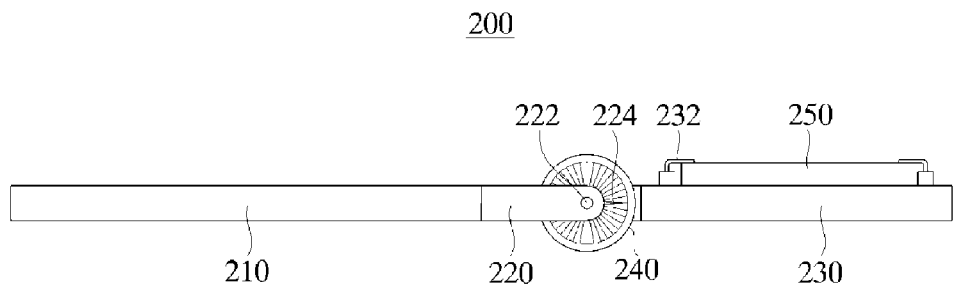
FIG. 6 is a side view of an auxiliary apparatus for measuring trend and plunge in accordance with an exemplary embodiment.
Figure 7:
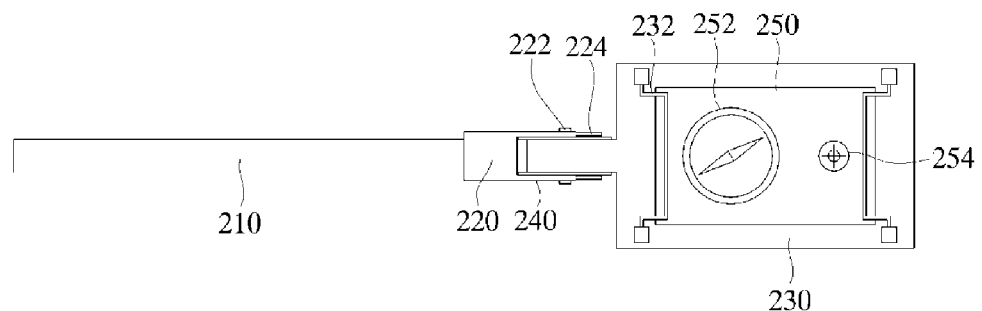
FIG. 7 is a plan view of the auxiliary apparatus for measuring the trend and plunge of FIG. 6.

FIG. 6 is a side view of an auxiliary apparatus for measuring trend and plunge in accordance with an exemplary embodiment. FIG. 7 is a plan view of the auxiliary apparatus for measuring the trend and plunge of FIG. 6.

Referring to FIGS. 6 and 7, an auxiliary apparatus 200 for measuring a trend and plunge includes a rod 210, a rotation block 220, a plate 230, and a protractor 240.

Since the rod 210, the rotation block 220, the plate 230, and the protractor 240 have the substantially same structure as those of the rod 110, the rotation block 120, the plate 130, and the protractor 140 described with reference to FIGS. 2 to 5, their detailed description will not be repeated.

Additionally, the plate 230 supports a measuring unit 10 for measuring a trend and horizontality of the plate 230.

The measuring unit 250 includes a compass 252 for measuring trend of a line and a level gauge 254 for measuring the horizontality of the plate 230. The compass and the level gauge may be integrated or separated from each other.

Alternatively, the measuring unit 250 may include a compass application for measuring trend of a line and a mobile phone in which a level gauge application for measuring the horizontal posture of the plate 230 is installed.

When the plate 230 is horizontally disposed, the measuring unit 250 may measure a direction of the rod 210. Since a formation lineation is parallel to the rod 210 and the rotation block 220, and a horizontal plane is parallel to the plate 230, the rod 210 may have the same direction as that of the trend. Thus, the direction of the rod 210 may be measured using the measuring unit 10 on the basis of a magnetic North to measure the trend.

Also, the measuring unit 250 may be disposed on the plate 230 to precisely confirm the horizontal posture of the plate 230.

The plate 230 may further include an attachment member 234 for connecting the measuring unit 250 to the plate 230. The attachment member 234 fixes the measuring unit 250 to prevent the measuring unit 250 placed on the plate 230 from being separated from the plate 230. The fixing member 234 may have various shapes such as a clamp and a clip.

Also, the plate 230 may further include a groove (not shown) for receiving the measuring unit 250. Since the measuring unit 250 is received in the groove, the measuring unit may be precisely seated on the plate 230 to more stably fix the measuring unit 250.

The auxiliary apparatus 200 for measuring trend and plunge may include the measuring unit 250 for measuring trend and the horizontal posture of the plate 230 to measure the trend and plunge of the lineation at the same time. Also, in the auxiliary apparatus 200 for measuring the trend and plunge, the rod 210 may be disposed parallel to the lineation and trend and plunge may be precisely and reproducibly measured.

The process for measuring trend and plunge using the auxiliary apparatus 200 for measuring trend and plunge may be performed with the same process as that for measuring the trend and plunge using the apparatus 100 for measuring the trend and plunge, after the measuring unit 250 is mounted on the plate 230.

As described above, the apparatus for measuring the trend and plunge and the auxiliary apparatus for measuring trend and plunge reliably make the measurements at the same time when the plate 130/230 is horizontally disposed. Also, in the apparatus for measuring trend and plunge the rod may be used to reproducibly and conveniently measure the trend and plunge even though the lineation has a small size.

Although the exemplary embodiments have been described it will be readily understood by those skilled in the art that various modifications and changes can be made thereto without departing from the spirit and scope of the present disclosure defined by the appended claims.

What is claimed is:

1. An apparatus for measuring trend and plunge, the apparatus comprising:
   a rod operable to be disposed parallel to a geologic lineation;
   a rotation block connected to one end of the rod and mounted to rotate around an imaginary central longitudinal axis of the rod, the rotation block includes a hinge shaft extending in a direction perpendicular to the imaginary central longitudinal axis;
   a plate coupled to the hinge shaft of the rotation block so that the plate is operable to rotate around the hinge shaft;
   a protractor disposed on the hinge shaft, the protractor being configured to confirm an angle between the rotation block and the plate, thereby being operable to measure trend of a geologic line feature when the plate is horizontally disposed; and
   a measuring unit disposed on the plate, the measuring unit comprising a compass configured to measure a direction of the rod, thereby being operable to measure trend when the plate is horizontally disposed.

2. The apparatus of claim 1, wherein the measuring unit further comprises a level gauge operable to confirm a horizontal posture of the plate.

3. The apparatus of claim 1, wherein:
   the protractor is fixed to the plate and rotated together with the plate, and
   the rotation block further comprises a needle protruding toward the plate and parallel to the rotation block to operable measure plunge of a geologic line feature.

4. An auxiliary apparatus for measuring trend and plunge, the auxiliary apparatus comprising:
   a rod operable to be disposed parallel to a geologic lineation;
   a rotation block connected to one end of the rod and mounted to rotate around an imaginary central longitudinal axis of the rod, the rotation block including a hinge shaft extending in a direction perpendicular to the imaginary central longitudinal axis of the rod;
   a plate coupled to the hinge shaft of the rotation block so that the plate is operable to rotate around the hinge shaft, the plate being configured to support a measuring unit for measuring the trend; and
   a protractor disposed on the hinge shaft, the protractor comprising a protractor configured to measure plunge of a geologic line.

5. The auxiliary apparatus of claim 4, wherein:
   the protractor is fixed to the plate and rotated together with the plate, and
   the rotation block further comprises a needle protruding toward the plate and parallel to the rotation block to precisely measure plunge.

6. The auxiliary apparatus of claim 5, wherein the plate further comprises a member configured to fix the measuring unit to the plate.

* * * * *